United States Patent [19]

Bourbeau

[11] Patent Number: 5,561,903
[45] Date of Patent: Oct. 8, 1996

[54] MESSENGER REMOVAL TOOL

[75] Inventor: Roger R. Bourbeau, Glastonbury, Conn.

[73] Assignee: Ben Hughes Communication Products Company, Chester, Conn.

[21] Appl. No.: 356,456

[22] Filed: Dec. 15, 1994

[51] Int. Cl.$^6$ ..................................... B21F 13/00
[52] U.S. Cl. ................................ 30/90.4; 30/280; 30/294
[58] Field of Search .................................. 30/90.1, 90.4, 30/90.8, 90.9, 91.1, 280, 282, 294; 81/9.4, 9.44; 29/764

[56] References Cited

U.S. PATENT DOCUMENTS

| | | | |
|---|---|---|---|
| 3,375,579 | 4/1968 | Solnksnes | 30/90.8 |
| 3,611,571 | 10/1971 | Belling | 30/280 |
| 3,750,281 | 8/1973 | Belling | 30/90.8 |
| 4,741,104 | 5/1988 | Noon | 30/90.4 |

Primary Examiner—Douglas D. Watts
Attorney, Agent, or Firm—McCormick, Paulding & Huber

[57] ABSTRACT

A hand tool for cutting an axially extending severable web of insulating material connecting two axially elongate cables in parallel axially spaced apart relation to each other has a generally cylindrical blade holder defining a bore for receiving one of the cables therethrough. A first slot communicates with the bore to receive the severable web. A second slot communicates with the first notch and opens outwardly through the peripheral surface of the blade holder to receive the other of the cables. A blade pivotally supported on the blade holder for movement between a cutting position, wherein the blade extends across the first slot, and a retracted position wherein the blade is disposed at one side of the first slot is normally biased toward its cutting position. Insertion of one of the cables into the bore and through the blade holder causes the blade to pivot to its retracted position allowing free movement of the tool relative to the one cable. Reverse movement of the blade holder relative to the one cable causes the blade to pierce the web and assume its cutting position wherein it extends across the first slot to cut the severable web as the tool is pulled off of the cable.

21 Claims, 2 Drawing Sheets

MESSENGER REMOVAL TOOL

BACKGROUND OF THE INVENTION

This invention relates in general to hand tools and deals more particularly with an improved tool for severing a web connecting a messenger or support cable to a communication cable. Cable assemblies of the type with which the present invention is used are employed extensively throughout the communications industry. A typical telephone cable assembly adapted to be supported by and extend between telephone poles includes a generally cylindrical communication cable and a generally cylindrical support cable or messenger of somewhat smaller diameter contained within a common jacket of severable insulating material and integrally joined by an axially extending connecting web. When it is necessary to splice the communications cable to another cable or to attach a connector to an end portion of the communication cable the messenger must be removed from association with the end portion of the communication cable. If the communication cable is to be inserted into a long run of conduit where numerous sharp bends may be encountered the messenger removal operation is necessarily more extensive.

It has been a common practice in the telecommunications industry to use an ordinary knife to sever the tough connecting web in such a cable assembly. However, this hazardous practice may cause serious personal injury. Further, the use of a knife to cut the web is likely to result in damage to the communication cable.

Heretofore, at least two special purpose tools have been provided for the express purpose of separating a supporting cable from a telephone cable or the like. The patent to Belling, U.S. Pat. No. 3,611,571, issued Oct. 12, 1971, discloses a hand tool with a T-shaped handle and a body having a slot for receiving the end portion of a support cable. A fixed blade mounted on the body and bridging the slot severs the web which connects the support cables to a communication cable as the tool is pulled inwardly from the free end of the support cable and along the support cable. A later patent to Belling, U.S. Pat. No. 3,750,281, issued Aug. 7, 1973, discloses another hand tool having a T-shaped handle and a fixed blade for separating a web attached support wire from a plastic covered cable. This tool may be brought into cutting engagement with the connecting web in spaced relation to an end of the cable. However, the tool must be positioned on the support wire at a 45 degree angle relative to the cable axis and then moved into parallel alignment with the axis to bring the blade into cutting position relative to the connecting web.

It is the general aim of the present invention to provide an improved hand tool of the aforedescribed general type which includes a moveable blade which permits easy entry of a cable into the tool and which automatically assumes a cutting position relative to the cable web when the direction of tool movement relative to the cable is reversed. It is a further aim of the invention to provide an improved hand tool having a cylindrical body and which is easy to grasp, hold and pull along an associated cable assembly in coaxial relation to a communication cable during a web cutting operation and which may be positioned on a cable to start a web cut in spaced relation to a free end of the cable.

SUMMARY OF THE INVENTION

In accordance with the present invention an improved hand tool is provided for cutting a severable web of insulating material connecting two axially elongate insulated cables in parallel axially spaced apart relation to each other. The hand tool comprises a blade holder having a bore extending in an axial direction through it and sized to receive one of the cables therethrough. A first slot formed in the blade holder opens into the bore along the entire length of the bore for receiving the connecting web when the one cable is received within the bore. A somewhat wider second slot extends through the blade holder, communicates with the first slot along the entire length of the first slot and opens outwardly through the peripheral surface of the blade holder. A blade having a cutting edge is supported for pivotal movement on the blade holder between a cutting position wherein a portion of the cutting edge is disposed within and extends transversely across the first slot and a retracted position wherein the cutting edge is displaced from its cutting position. The blade moves from its cutting position to a retracted position in response to insertion of an end portion of the one cable into the bore and moves to its cutting position to sever the web as the one cable is withdrawn from the bore.

DETAILED DESCRIPTION OF PREFERRED EMBODIMENT

Figure 1:
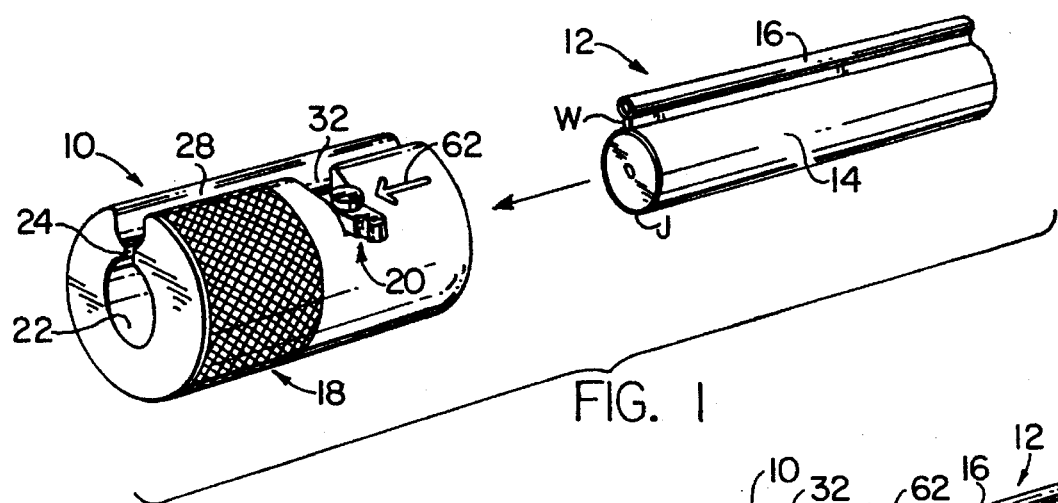
FIG. 1 is a fragmentary perspective view of a messenger removal tool and a cable assembly positioned for insertion into the tool.
Figure 2:
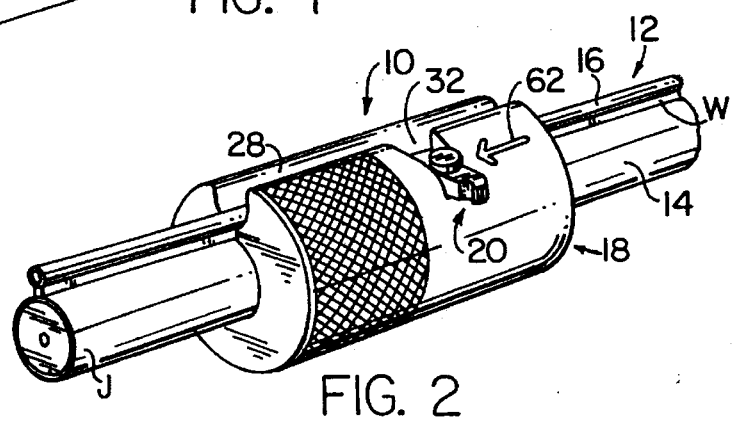
FIG. 2 is similar to FIG. 1 but shows the tool with the cable inserted into it.

Turning now to the drawing a messenger removal tool embodying the present invention is indicated generally by the reference numeral 10. The illustrated hand tool 10 is particularly adapted to separate the messenger from a telecommunication cable assembly such as the cable assembly indicated generally at 12 and shown in FIGS. 1 and 2. The cable assembly 12 includes a coaxial communication cable 14 and a messenger or support cable 16 contained within a common insulation jacket J and connected together by a web W which extends between and axially along the two cables 14 and 16 and comprises an integral part of the severable jacket J. The illustrated tool 10 is particularly adapted to sever the web W to separate the messenger 16 from the coaxial cable 14 when the cable assembly 12 is freely inserted into the tool 10 and the tool is pulled off of the cable 14 in a direction opposite the direction of cable insertion, as will be hereinafter further discussed.

Considering now the tool 10 in further detail, it essentially comprises a tool body or blade holder indicated generally at 18 which supports a moveable blade designated generally by the numeral 20. The blade holder may be made from any suitable material. However, the illustrated blade holder 18 is made from metal, preferably aluminum, and is generally cylindrical and sized to be grasped and held in one hand. Preferably, at least a portion of the peripheral surface of the blade holder is knurled, substantially as shown, to provide a comfortable gripping surface. A bore 22 extends coaxially through the blade holder 18 and is sized to slideably receive one or the other of the two cables 14 and 16 which comprise the cable assembly 12. In accordance with the presently preferred construction the bore 22 is sized to receive the communication cable and has a diameter slightly larger than the diameter of the communications cable which is usually somewhat larger in diameter than the messenger which supports it.

Figure 4:
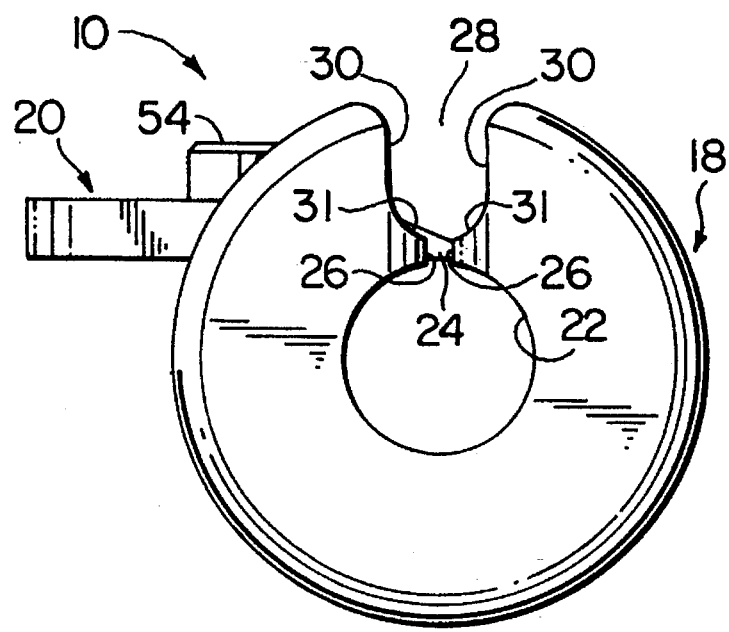
FIG. 4 is an end elevational view of the tool.

A generally radially disposed and axially extending first slot 24 opens into the bore 22 and extends along the entire length of the bore. The slot 24 is defined by opposing generally parallel side walls 26, 26 and has a width slightly greater than the width dimension of the web W which it is adapted to receive. A somewhat wider axially extending second slot 28 formed in the blade holder 18 opens into the first slot 24, extends along the entire length of the first slot and opens outwardly through the outer peripheral surface of the blade holder 18. The second slot 28 is further characterized by substantially parallel side walls 30, 30 and particylindrical inner walls 31, 31 as best shown in FIG. 4. In accordance with the presently preferred construction, the second slot 28 is adapted to slidably receive the messenger 16 and has a width dimension slightly larger than the diameter of the messenger 16.

Figure 3:
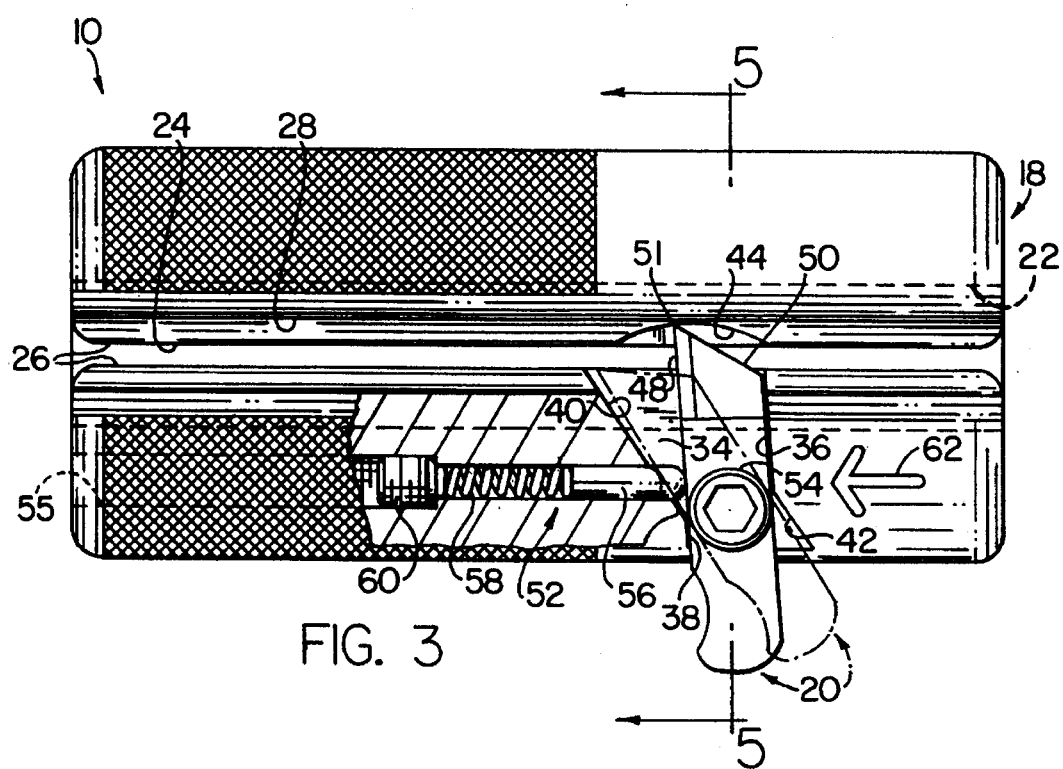
FIG. 3 is a somewhat enlarged plan view of the messenger removal tool shown in FIGS. 1 and 2, a portion of the tool shown broken away to reveal structure thereunder.

An outwardly open notch 32 formed in the blade holder 18 opens outwardly through the peripheral surface into the first and second slots 24 and 28. The inner end of the notch 32 is defined by a substantially planar surface 34 substantially tangent to the bore 22 and normal to the planes of the opposing side walls 26, 26. The notch 32 is further defined by a pair of parallel side walls 36 and 38 (FIG. 3) which are generally radially disposed relative to the axis of the bore 22 and another pair of side walls 40 and 42 which are parallel to each other, generally normal to the surface 34 and inclined to the axial direction, as best shown in FIG. 3. An arcuate outwardly open recess 44 is formed in the blade holder 18 at the side of the first slot 24 opposite the notch 32. The inner surface of the arcuate recess 44 lies in the same plane as the notch inner surface 34.

Figure 5:
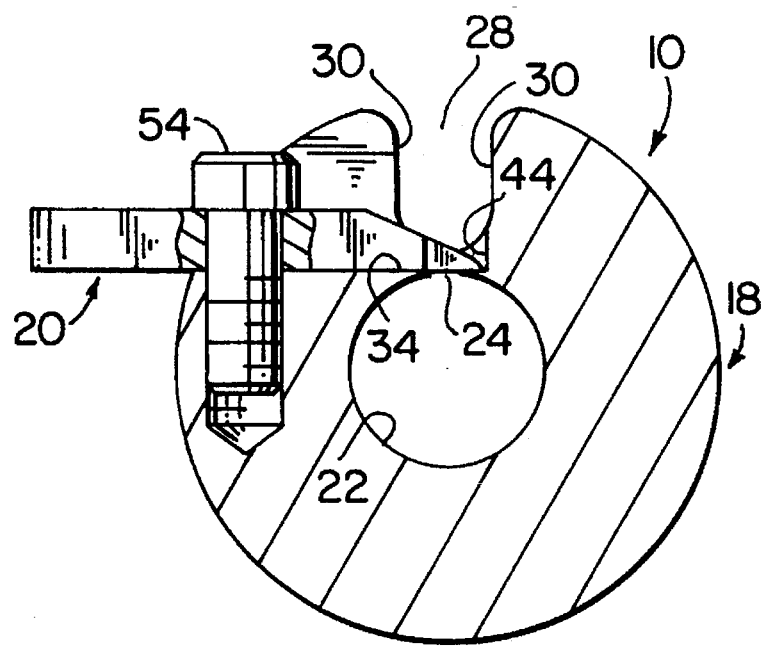
FIG. 5 is a sectional view taken along the line 5—5 of FIG. 3.

The blade 20 is made from rectangular blade stock and has a cutting edge 48 at its inner end and a rake 50 which cooperate to define a point 51 at the inner end of the blade. A stud 54 which threadably engages the blade holder 28 secures the blade 20 intermediate its ends for pivotal movement within the notch 32, as best shown in FIG. 5. The outer end portion or handle of the blade 20 protrudes outwardly for some distance beyond the peripheral surface of the blade holder 18, substantially as shown. The blade 20 is supported for pivotal movement between a cutting position, shown in full lines and a fully retracted position indicated by broken lines in FIG. 3. The notch surfaces 36 and 38 cooperate with associated surfaces of the blade to limit movement of the blade to and maintain it in its cutting position wherein the cutting edge extends across the first slot 24. The notch side wall surfaces 40 and 42 cooperate with associated surfaces on the blade to limit travel of the blade 20 and to establish the fully retracted position of the blade. In its fully retracted or broken line position of FIG. 3 the blade 20 is wholly disposed within the notch 32. A plunger mechanism indicated generally at 52 and threadably engaged within the blade holder 18 biases the blade 20 toward its cutting position of FIG. 3. The plunger mechanism is received within a stepped plunger bore 54 in the blade holder 18 which opens through one end of the holder and may comprise a unitary assembly. However, the illustrated plunger assembly includes a plunger 56, a biasing spring 58 which urges the plunger into engagement with the blade 20 within the notch 32 and a retaining fastener 60 threaded into the bore 55. Preferably, and as shown, a directional arrow 62 or other appropriate directional indicia is provided on the surface of the blade holder 18 to indicate the direction of entry or insertion of a cable assembly, such as the cable assembly 12 into the tool 10.

Preparatory to separating an end portion of the messenger 16 from the coaxial cable 14 the cable assembly 12 is inserted into the bore 22 in the direction indicated by the directional arrow 62. As the cable 12 is inserted into the tool 10 or the tool is moved onto the cable 12 the free end of the web W engages the blade rake 50 causing the blade to pivot in counterclockwise direction from its full line or cutting position of FIG. 3 to a retracted position against the biasing force of the spring plunger mechanism 52. The tool 10 is moved onto and along the cable assembly 12 to a position wherein the blade point 51 is located at the starting point of a desired cut to be made in the web W. When the blade is properly positioned relative to the web the direction of tool movement relative to the cable assembly 12 is reversed. More specifically, the knurled portion of the tool is grasped and the tool is pulled along the cable assembly 12 in the cutting direction indicated by the directional arrow 62 or toward the left as the tool 10 appears oriented in the drawing. Initial movement of the tool in the cutting direction relative to the cable assembly causes the pointed end of the tool to incise and pierce the web W. Further movement of the tool in the direction of the directional arrow 62 and relative to the cable assembly 12 causes the blade 20 to pivot in clockwise direction as viewed in FIG. 3 and assume its cutting position wherein the blade engages the abutment surfaces defined by the notch side walls 36 and 38. Thereafter, further movement of the tool in the cutting direction indicated by the directional arrow 62 and relative to the cable assembly 12 causes the blade 20 to cut the web W along a line of cut substantially tangent to the coaxial cable 14. Thus, the web W will be severed along a line substantially tangent to the portion of the insulation jacket J on the coaxial cable 14 without risk of damage to the cable or injury to the tool operator.

If it should be necessary to reposition the tool 10 on or remove the tool from the cable assembly before the cutting operation has been completed slight reverse movement of the tool will stop the cutting operation and will usually cause the blade to move to its retracted position. If the blade does not retract in response to reverse movement of the tool the blade may be manually moved to its retracted position by applying finger pressure to the protruding handle end of the blade 20 to pivot the blade in a counterclockwise direction, as viewed in FIG. 3. The blade may then be held in its retracted position by light finger pressure applied to its handle end while the cable is removed from the blade holder.

During the cutting operation the entire cross section of the cable is disposed within the peripheral confines of the blade holder, so that the blade holder may be conveniently gripped with risk of contacting the cable assembly. The web is sheared along a line substantially tangent to the insulation jacket on the communication cable to produce a "clean" end on the latter cable jacket for receiving an associated connector.

I claim:

1. A hand tool for cutting a web of severable material connecting first and second cables and retaining said cables in spaced apart axially parallel relation to each other, said hand tool having a blade holder defining a bore extending axially therethrough for receiving a portion of one of the cables therein, slot means defined by said blade holder for receiving portions of the web and the other of the cables therein and extending in an axial direction through said blade holder and opening into said bore along the entire length of said bore, a blade having a cutting edge, means supporting said blade on said blade holder for movement between a cutting position wherein said blade is disposed with said cutting edge extending transversely across said slot means and an inactive position wherein said blade is disposed at one side of said slot means, and biasing means for urging said blade toward said cutting position.

2. A hand tool as set forth in claim 1 wherein said biasing means comprises a spring biased plunger assembly.

3. A hand tool as set forth in claim 2 wherein said spring biased plunger assembly is threadably engaged with said blade holder.

4. A hand tool as set forth in claim 1 wherein said blade is pivotally supported intermediate its ends.

5. A hand tool as set forth in claim 4 wherein said blade has a handle extending outwardly beyond the outer peripheral surface of said blade holder.

6. A hand tool as set forth in claim 5 wherein said supporting means comprises a stud threadably engaged with said blade holder.

7. A hand tool as set forth in claim 1 wherein said cutting edge is generally tangent to said bore when said blade is in its cutting position.

8. A hand tool as set forth in claim 1 wherein said slot means includes a first slot communicating with said bore and a second slot and opening into said first slot and outwardly through the peripheral surface of said blade holder.

9. A hand tool as set forth in claim 8 wherein said second slot is substantially wider than said first slot.

10. A hand tool as set forth in claim 9 wherein said bore is sized to slideably receive said one cable therethrough.

11. A hand tool as set forth in claim 10 wherein said first slot is sized to slideably receive said web therethrough.

12. A hand tool as set forth in claim 11 wherein said second notch is sized to slidably receive the other of the cables therethrough.

13. A hand tool as set forth in claim 1 including arresting means on said blade holder for limiting movement of said blade between said cutting position and said releasing position.

14. A hand tool as set forth in claim 11 wherein said arresting means comprises walls defining said notch.

15. A hand tool as set forth in claim 1 wherein said cutting edge terminates at a point.

16. A hand tool as set forth in claim 1 wherein said blade holder is generally cylindrical and said bore comprises a coaxial bore.

17. A hand tool for cutting a web of severable insulating material connecting two axially elongate cables in spaced apart parallel relation to each other, said hand tool comprising a generally cylindrical blade holder having a generally cylindrical bore extending coaxially through it, said bore being sized to slideably receive one of the cables therethrough, a first slot extending in an axial direction through said blade holder and communicating with said bore throughout the entire axial length of said bore, said first slot being sized to slideably receive said web therethrough, a second slot extending in an axial direction through said blade holder and communicating with said first slot throughout the entire length of said first slot, said second slot opening outwardly through the peripheral surface of said blade holder and being sized to slidably receive the other of the cables therethrough, a notch formed in said blade holder and communicating with said first slot and said second slot and opening outwardly through said peripheral surface, said notch having an inner wall disposed within a plane generally tangent to said bore, a blade having a cutting edge and mounted on said blade holder for limited pivotal movement within said notch between a cutting position wherein said cutting edge extends across said first slot in generally tangential relation to said bore and a retracted position wherein said cutting edge is disposed at one side of said first slot, said blade having a handle extending outwardly beyond said peripheral surface, and biasing means for urging said blade toward its cutting position.

18. A hand tool as set forth in claim 17 wherein said biasing means comprises a spring biased plunger threadably engaged in said blade holder and engaging said blade.

19. A hand tool as set forth in claim 18 wherein said blade has a pointed free end and said cutting edge terminates at said pointed free end.

20. A hand tool for cutting an axially extending severable web of insulating material connecting two axially elongate insulated cables in parallel axially spaced apart relation to each other, said hand tool comprising a blade holder having a bore extending in an axial direction therethrough and sized to receive one of said cables therein, a first slot formed in said blade holder and communicating with said bore for receiving the web connected to a cable received within the bore, said slot extending in an axial direction through said blade holder, a second slot extending in axial direction through said blade holder and communicating with said first slot for receiving the other of the cables therein, said second slot opening outwardly through the peripheral surface of said cylindrical blade holder, and a blade having a cutting edge and supported on said blade holder for pivotal movement between a cutting position wherein at least a portion of said cutting edge is disposed within and extends transversely across said first slot and a retracted position wherein said cutting edge is displaced from its cutting position.

21. A hand tool as set forth in claim 20 including biasing means for urging said blade toward its cutting position.

* * * * *